United States Patent
Holmes

(10) Patent No.: US 6,309,168 B1
(45) Date of Patent: Oct. 30, 2001

(54) LIFT FOR A HAND TRUCK

(76) Inventor: Jerry Holmes, 3821 Castle Cir., Lincoln, NE (US) 68524

( * ) Notice: Subject to any disclaimer, the term of this patent is extended or adjusted under 35 U.S.C. 154(b) by 0 days.

(21) Appl. No.: 09/527,068

(22) Filed: Mar. 16, 2000

Related U.S. Application Data

(60) Provisional application No. 60/116,518, filed on Jan. 20, 1999.

(51) Int. Cl.[7] ........................................................ B62B 1/04
(52) U.S. Cl. ........................... 414/490; 414/444; 414/446
(58) Field of Search ................................. 187/224, 231, 187/235; 414/490, 446, 444

(56) References Cited

U.S. PATENT DOCUMENTS

| | | |
|---|---|---|
| D. 357,782 | 4/1995 | Hockenberry et al. . |
| 2,875,852 | 3/1959 | Morrell . |
| 2,894,605 | 7/1959 | Leavitt . |
| 2,925,887 | 2/1960 | Gibson . |
| 2,981,374 * | 4/1961 | Holsclaw .............................. 187/231 |
| 3,055,523 * | 9/1962 | Wurn .................................... 414/498 |
| 3,385,401 | 5/1968 | Campbell et al. . |
| 3,870,177 * | 3/1975 | Cobb .................................... 414/446 |
| 3,907,138 | 9/1975 | Rhodes . |
| 3,951,286 * | 4/1976 | Horst ............................... 187/235 X |
| 4,049,083 * | 9/1977 | Garvey ................................. 187/232 |
| 4,421,209 * | 12/1983 | Vermette et al. .................... 187/235 |
| 4,737,065 * | 4/1988 | Ju ......................................... 414/490 |
| 5,170,863 * | 12/1992 | Devroy ................................. 187/224 |
| 5,251,922 * | 10/1993 | Mann ............................... 414/490 X |
| 5,975,826 * | 11/1999 | Scholder .............................. 444/444 |

FOREIGN PATENT DOCUMENTS

WO94/05537   3/1994   (WO) .

* cited by examiner

Primary Examiner—Steven A. Bratlie
(74) Attorney, Agent, or Firm—Gene Scott-Patent Law & Venture Group

(57) ABSTRACT

A detachable lifting device can be attached to and works in conjunction with an upright portion of a hand truck. The invention allows the user to move heavier loads than would be possible with the hand truck alone, and to lift the loads to table or counter levels. The invention is formed with a preferably rectangular frame, including laterally spaced-apart lift rails. A winch assembly, lifting cable, cable winding element, and a pulley operate with the frame to slide a lifting platform upwardly and downwardly along lift rails in a space formed by a spacer attached between the hand truck and the lift rail. The platform attachment is inventively designed with a bolt, bushing, and nut assembly, wherein the bushings frictionally engage with and rotate circularly against the lift rails as the platform moves up and down them. Preferably, the invention is operated via remote control. The invention allows the user to lift heavy loads with a device that is lightweight, portable, and can be attached to any hand truck or cart.

7 Claims, 3 Drawing Sheets

LIFT FOR A HAND TRUCK

The present application refers to a previously filed provisional patent application having Ser. No. 60/116,518 and an assigned filing date of Jan. 20, 1999 and which contains subject matter substantially the same as that described and claimed in the present application.

BACKGROUND OF THE INVENTION

1. Field of the Invention

This invention relates generally to automated lifts for moving materials and parcels and more particularly to a device for lifting packages via a platform engaged with a winch assembly and attachable to a hand truck.

2. Description of Related Art

The following art defines the present state of this field:

Garvey, et. al. U.S. Pat. No. 4,049,083 describes a stacker attachment used to extend the versatility of a battery powered two wheel hand truck, which can lift loads from one level to another; and, more importantly, operate as a walker for moving loads up and down the stairs; but which two wheel hand truck cannot operate as a stacker because its inner movable frame can never be raised above the wheels at the bottom of the stationary frame of the two wheel hand truck. The stacker has a long stationary frame, but a short inner movable frame relative to the stationary frame. The stacker has an elongated screw shaft which freely rotates in a journal at the top of the long stationary frame, but which is operatively joined to a bearing nut fixed to the top wall of the inner movable frame, and is operatively engaged to the electric motor. The short inner frame has a long lifting path along the elongated stationary frame for lifting and stacking loads. The stacker is releasably but securely mounted to the two wheel hand truck, and the stacker has conductors and elongated battery leads which can be connected to the battery carried by the two wheel hand truck. Switch means on the stacker selectively rotate the stacker lead screw in one of two opposite rotational directions to lift the inner movable frame, and an attached lifting plate raises loads for stacking, and also lowers such inner movable frame to its starting position at the bottom of the stacker.

Davis, et al. U.S. Pat. No. 5,885,047 describes a transport device, or hand truck (10), having a load carrying surface (26) that is mounted to move up and down along the hand truck (10). The level of the load carrying surface (26) is changed by the amount of air within a pneumatic cylinder (40). The amount of air in the pneumatic cylinder (40) is determined by a pneumatic adjustment subsystem (42) and the load on the load carrying surface (26). Preferably, the pneumatic adjustment subsystem (42) is set so that the top item located on the load carrying surface (26) is always at waist level. The pneumatic adjustment system (42) permits the pneumatic cylinder (40) to be offset an incremental amount respective to items of identical weight and height being removed from or placed upon the load carrying surface (26). Thus, as items are removed from the load carrying surface (26), the load carrying surface indexes upward so that the top item is readily available at waist level.

Wilke, et al. U.S. Pat. No. 5,368,130 describes a manually movable lift truck having a base with a self-contained power plant therein, and a single column rising therefrom. The column includes a single hollow post with a drive transmitting screw shaft therein and a ball carriage on the shaft. A flexible chain has an outer end connected with the lift fork, and runs upwardly and then down into the interior of the post. The chain is drivingly connected with the ball carriage.

Morrell, et. al. U.S. Pat. No. 2,875,852 describes a power driven material handling truck having, in combination, a horizontal base frame, a pair of fixedly mounted horizontally disposed outriggers, supporting wheels at the forward ends of each of said outriggers, a driver's platform connected to the back of said base frame, a vertically disposed bearing in said platform medially between said outriggers, a turntable having a kingpin mounted in said bearing and disposed below platform, a single driving wheel mounted directly below said turntable and on its vertical axis, a hydraulic jack mounted on said base, a pair of vertical parallel uprights, a carrier reciprocally mounted on the front of said uprights, and a connection between said carrier and said hydraulic jack for raising and lowering the same, said turntable having a face gear secured to the top of the same, a pinion meshing therewith, a vertical shaft extending from said pinion above said driver's platform, and a steering wheel connected to the upper end of said shaft.

Campbell, et. al. U.S. Pat. No. 3,385,401 describes a vertical hoist having a main frame normally vertically disposed and having a plurality of base wheels; and, additionally a pair of auxiliary wheels disposed above the base wheels and to the rear of the hoist, in such position that the center of gravity of the hoist, when tilted to bear upon the auxiliary wheels and the pair of the base wheels, is disposed between the axis of the pair of base wheels and the auxiliary wheels, when the elevator frame of the hoist is lowered ere to a lowermost position, such that the normally vertical frame portion of the hoist is tilted backwardly in an inclined position to reduce the overall elevation of the hoist, and to allow the movement of the hoist under low overhead obstructions while movably supported on a pair of the base wheels and the auxiliary wheels.

Williamson, et. al. WO 94/05537 describes an improved hand truck having an unloader mechanism for assisting in the removal of cargo from the hand truck. The unloader mechanism utilizes a cargo support (28) pivotally mounted at the lower end of the hand truck. The cargo support (28) is designed so that it can be maintained in a latched position when transporting cargo, and can be unlatched to pivot away from the hand truck when unloading cargo. A pusher structure (30) may be operatively connected to said cargo support to facilitate the removal of cargo from said cargo support. The pivot action of the cargo support causes a force to be exerted on the cargo by the pusher structure, which urges such cargo down an inclined plane formed by the cargo support, thereby removing the cargo from the hand truck.

Leaviitt, et. al. U.S. Pat. No. 2,894,605 describes a fork lift truck comprising a frame, said frame including a horizontal base having supporting wheels, and further including a pair of spaced, parallel channel bars having front and rear flanges defining outwardly facing channels, said bars being attached to and extending upwardly from said base. The frame also includes four crossmembers, said crossmembers connecting channel bars. A fork lift carriage spans said bars and has roller means mounted on the bars to run on said forward flanges. A brake drum is mounted on the spindle, with a brake-lined band having two ends, with a pivot fixed to said frame pivotally anchoring one said end externally and adjacent to said drum. A second band end urges said band end into braking engagement with a drum. A brake handle is pivoted at one end and has an intermediate portion pivotally attached to the second band end, said band being selectively loosenable and tightenable about said drum by manual operation of the handle. Pulleys, a cable, an electric motor means, and a flexible drive means connecting the motor pulley with the drum and reel. A motor is energized by a battery to rotatably drive the drum and reel, frictionally urging the second band end to move against the force of the spring to loosen the band on said drum. A floor brake handle is attached to a block for manually raising and lowering the block. A hook catch is mounted on the frame and is engageable by the floor brake handle when the block is in a raised position. A U-shaped tubular handle connects the channel bars, protrudes horizontally rearwards therefrom, and passes outwardly protectingly beyond said drum brake handle.

Duderstadt et. al. U.S. Pat. No. 4,944,368 describes a fork lift assembly supported against a single rectangular mast by at least four separate bearing wheel assemblies. The rectangular mast is positioned relative to the fork lift assembly, so that a front edge of the rectangular mast is positioned directly in line with the torque forces exerted by the load. Since the bending forces applied to the mast by the lifted load are in the direction of the edge of the mast, as opposed to the side of the mast, the mast can support a greater load. Further, the positioning of the four bearing wheel assemblies contacting each of the four sides of the mast inherently eliminates any side-to-side and twisting play in the fork lift assembly.

Fox et. al. U.S. Pat. No. 4,034,878 describes a hand truck having elongated telescoping frame means for raising and lowering a load bearing flanged bed which is secured to a base portion and extends forwardly of a frame means. A pair of support wheels are mounted on opposite ends of an axle shaft for supporting the truck, and a screw shaft is mounted for rotation within the frame means for raising and lowering the respective segments of the telescoping frame means. Auxiliary carriage means are swingably mounted upon the base of the frame and have a pair of castors at the free end thereof. Bracket means are secured to the telescopically arranged frame at a certain elevation to form a generally triangular support for the frame with the auxiliary carriage. Winch means are coupled to the frame at a point between the location of the carriage bracket and the base, and means are provided for operating the winch means. A battery power source is provided, with a battery-supporting cradle positioning the battery and cradle in the structure.

Hockenberry, et. al. U.S. Pat. No. D357,782 describes the ornamental design for a handcart, showing a lift platform attached to a wheeled cart with a handle.

Gibson, et. al. U.S. Pat. No. 2,925,887 describes a material handling truck having, in combination, a frame, a motor-driven wheel swivel-mounted in said frame for steering, said frame comprising also two wheel-supported outriggers extending rearwardly from said motor driven wheel and said outriggers having their supporting wheels substantially offset and away from said driving and steering wheel in one dimension, and from each other, in a transverse dimension, one of said outrigger supporting wheels being castered and the other being arranged to be swivelled into and to be locked in either of two planes of rotation parallel to the aforementioned dimensions.

Rhodes, et. al. U.S. Pat. No. 3,907,138 describes an electrically powered, two wheeled hand truck having telescoping frame parts, the inner frame part being raised and lowered by electric power means in the form of a rotatable screw shaft which engages a bearing nut fixed to the inner movable frame part. Rotation of the screw in a particular direction either lowers or raises the inner frame part. A DC motor is carried by the hand truck and powered by a battery voltage source also carried by the hand truck. Electrical switching means select the direction of rotation of the screw shaft for lowering or raising the inner movable frame part. Rapid and accurately controlled raising and lowering allows moving a load carried on the movable frame part from a raised position to a lowered position and vice-versa. A braking means holds the screw shaft when the motor is turned off so that the load does not slip. Starting the motor overrides the braking means to either raise or lower the load.

The prior art teaches various hoists, hand trucks, and fork lift trucks, some portable, but none of which are a lifting device, detachable and working in conjunction with the upright portion of a hand truck, that it also includes a bolt, bushing, and nut assembly attached to the lifting platform, and frictionally engaging and rotating circularly against lift rails, thereby allowing the lifting platform to move freely up and down the lift rails. The lifting platform moves in a space created by a spacer holding the hand truck in a spaced relationship with the lift rails. The present invention fulfills these needs and provides further related advantages as described in the following summary.

SUMMARY OF THE INVENTION

The present invention teaches certain benefits in construction and use that give rise to the objectives described below.

The present invention provides a detachable lifting device that can be attached to and works in conjunction with the upright portion of a hand truck, to help one utilize the hand truck more effectively, to lift and move heavier loads. The invention is formed with a preferably rectangular frame, including laterally spaced-apart lift rails. A winch assembly, lifting cable, cable winding element, and a pulley operate with the frame to slide a lifting platform upwardly and downwardly along the lift rails, using an inventive design providing a spacer which allows an attachment to the lift platform to move up and down the lift rails with ease. The platform attachment is designed with a bolt, bushing, and nut assembly, wherein the bushings frictionally engage with and rotate circularly against the lift rails as they move along them. Therefore, the invention enables the user to lift heavy loads with a lightweight device that can be attached to any hand truck or cart. Preferably, the invention is operated via remote control.

A primary objective of the present invention is to provide a detachable lifting apparatus to be used with a hand truck having advantages not taught by the prior art primary among which is the ability to lift packages from ground level to a vertical height that is more useful.

Another objective is to provide an invention, which, though relatively lightweight, is capable of lifting heavy loads.

A further objective is to provide such an invention capable of disassembly for being easily stored or used with another hand truck.

A still further objective is to provide such an invention capable of being operated by a lightweight battery.

A still further objective is to provide such an invention capable of being mounted to an inexpensive two-wheel cart.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figures 1, 2:
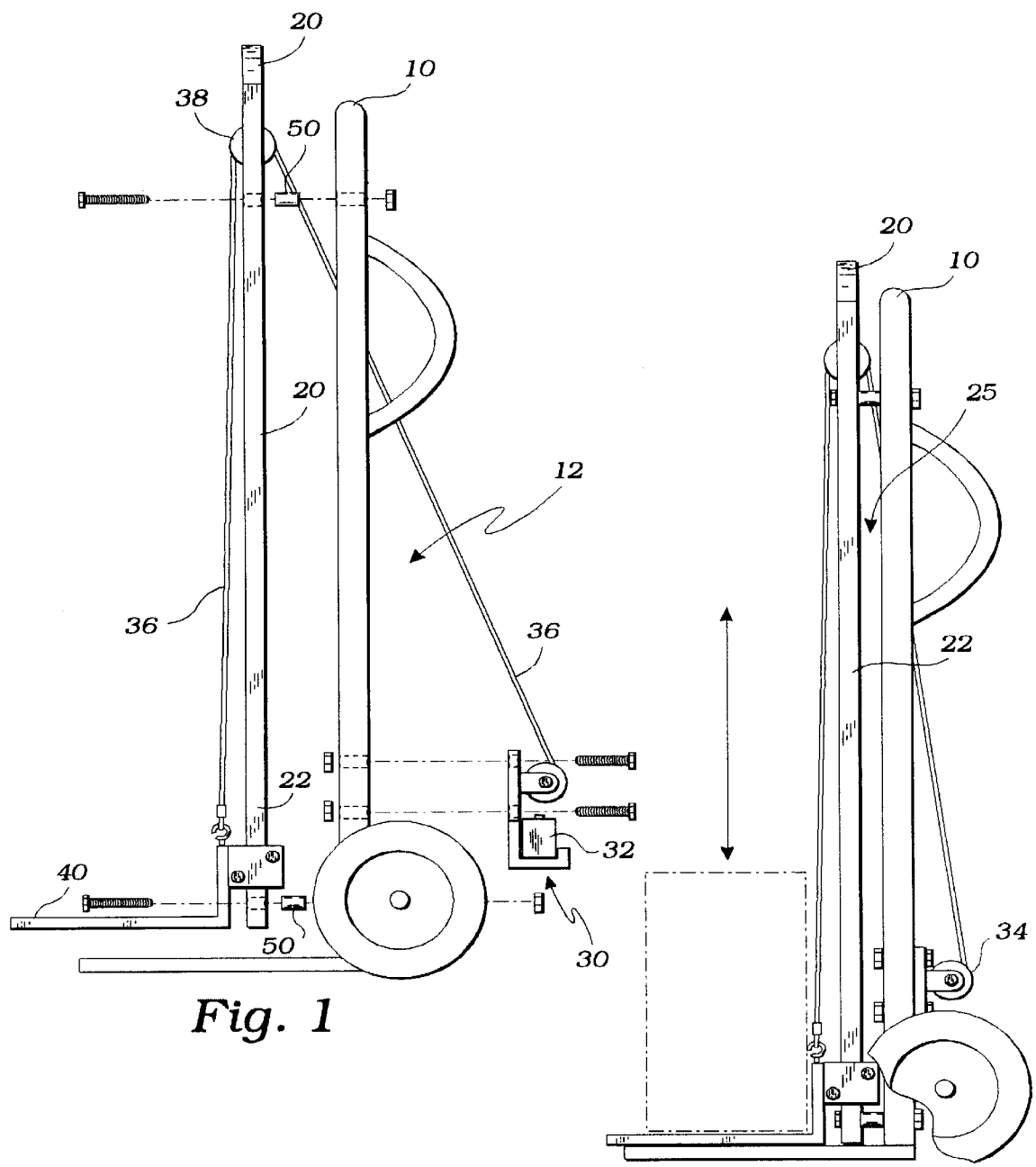
FIG. 1 is an exploded side elevational view of the preferred embodiment of the present invention.
FIG. 2 is similar to FIG. 1, but shown assembled and ready for use.
Figure 3:
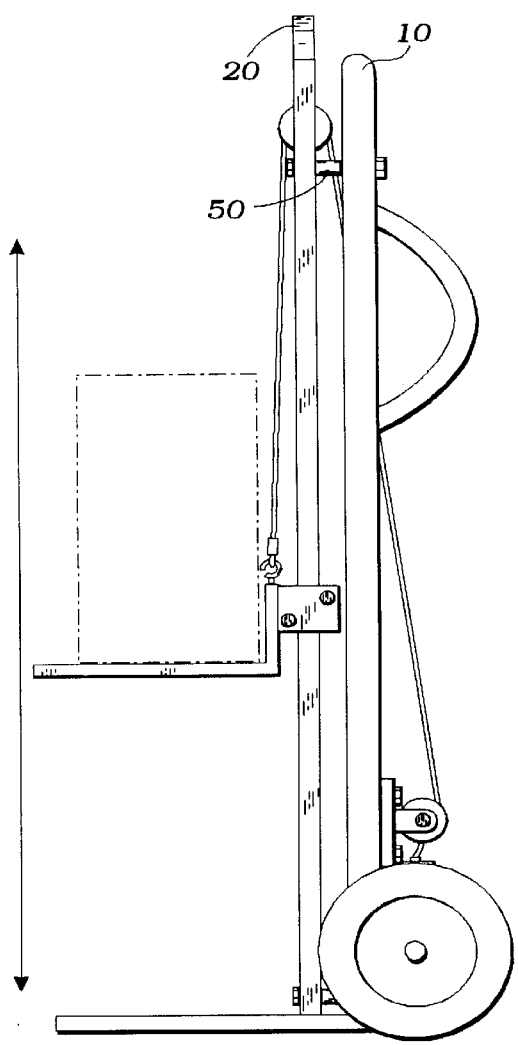
FIG. 3 is similar to FIG. 2, showing a lifting platform in an elevated position.
Figure 4:
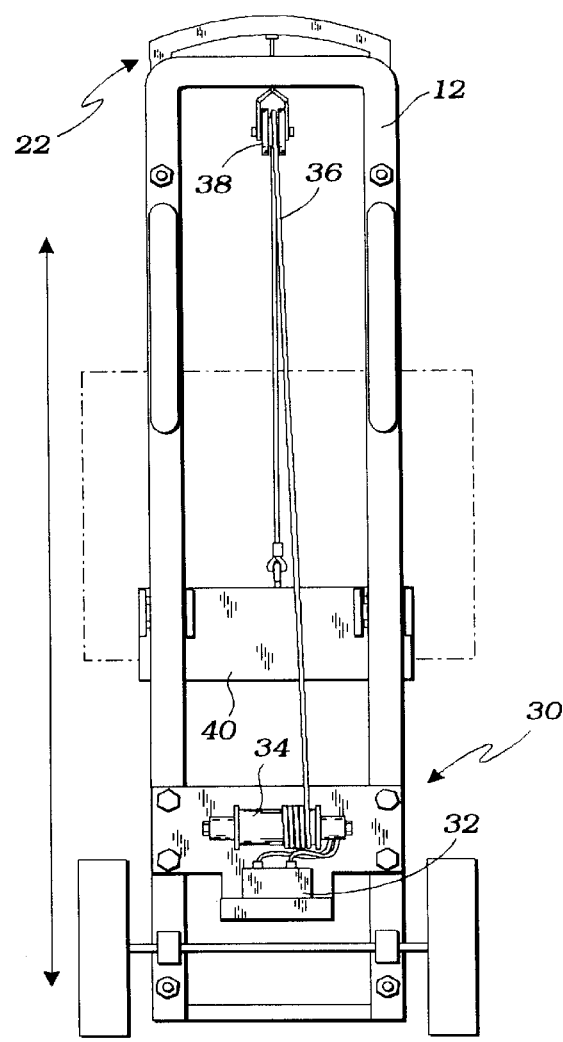
FIG. 4 is a rear elevational view thereof.
Figure 5:
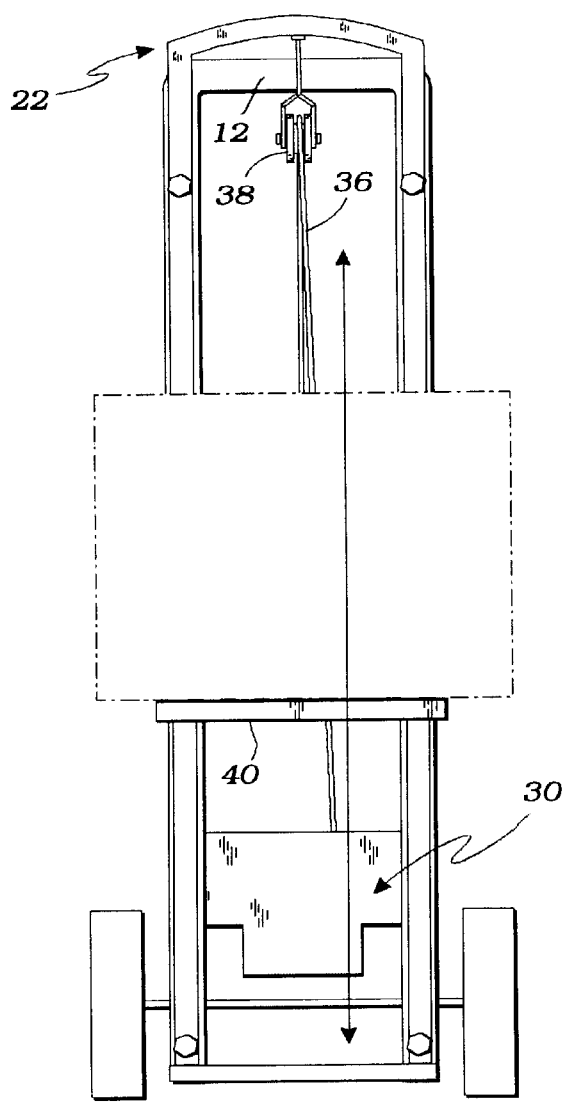
FIG. 5 is a front elevational view thereof.
Figure 6:
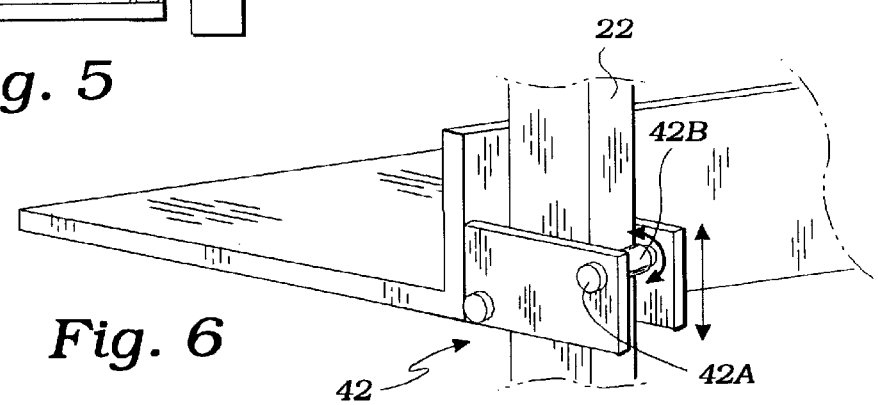
FIG. 6 is a partial perspective view thereof showing the means by which the lifting platform is slidably engaged with lift rails.

The above described drawing FIGS. 1–5 illustrate the invention, a lifting apparatus for attachment to a hand truck 10, the apparatus comprising a structural frame 20, preferably of a generally rectangular shape and constructed of square tubing, enabled for being removably fixed adjacently to, and spaced apart from, an upright portion 12 of the hand truck 10. The structural frame 20 provides laterally spaced and separated lift rails 22. A winch assembly 30 is enabled for being fixed, with common hardware, to the upright portion 12 of the hand truck 10 opposite a lower end of the structural frame 20. The winch assembly 30 engages a lifting platform 40 so as to move said lifting platform along the lift rails 22 for lifting packages placed on the lifting platform 40. Preferably, the winch assembly 30 further comprises an electrical storage battery 32 providing motive energy for driving a cable-winding element 34.

In the preferred embodiment, a lifting cable 36 extends upwardly from the cable-winding element 34 of the winch assembly 30 to a pulley 38 mounted at an upper end of the structural frame 20, and thence downwardly to engage the lifting platform 40. The lifting platform 40 extends generally horizontally outwardly from the structural frame 20 so as to accommodate packages and provides a means for directing the lifting platform 40 along the lift rails 22 while being slidably engaged therewith. The lifting platform 40 includes a means of attachment 42 to the lift rails 22, using bolts 42A, bushings 42B, and nuts (not shown) as an assembly, as best seen in FIG. 1, wherein the bushings 42B frictionally engage with, and rotate against the lift rails 22 as the lifting platform 40 moves along the rails 22. Inventively, the structural frame 20 provides spacers 50 which are attached, with common hardware as shown, between the structural frame 20 and the lift rails 22 and create a space 25 between the two, thereby allowing the lifting platform attachment means 42 to move in the space provided. Further, the cable winding means 34 and the lifting cable 36 cooperate to move the lifting platform 40 vertically along the lift rails 22 when the hand truck is in the vertical attitude. The opposing bushings 42B are positioned for tightening against the lift rails 22 when a weight is applied to the lifting platform 40. This has the advantage of tending to prevent the lifting platform 40 from jerking if the lifting cable 36 is not taught when the weight is applied. The lifting cable 36 is applied so as to reduce the griping force of the opposing bushings 42B against the lift rails 22 when the lifting cable 36 is taught. This has the advantage of easing the gripping forces on the lift rails 22 so as to enable lifting with less tension in the cable 36.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A lifting apparatus for attachment to a hand truck, the apparatus comprising:

a structural frame enabled for being removably fixed adjacently to, and spaced apart from, an upright portion of a hand truck, the structural frame providing laterally spaced and separated lift rails;

spacers positioned between the upright portion of the hand truck and the structural frame, the spacers defining a space therebetween;

a winch assembly enabled for being fixed to the upright portion of the hand truck opposite a lower end of the generally rectangular frame, the winch assembly engaging a lifting platform so as to move said lifting platform along the lift rails for lifting a package placed on the lifting platform;

the lifting platform engaging the lift rails with a pair of opposing bushings positioned to contact the lift rails on opposite sides thereof.

2. The apparatus of claim 1 wherein the winch assembly is electrically operated.

3. The apparatus of claim 1 wherein the opposing bushings, being at different elevations, are positioned for tightening against the lift rails when a weight is applied to the lifting platform.

4. A lifting apparatus for attachment to a hand truck, the apparatus comprising:

a generally rectangular frame enabled for being removably fixed adjacently to, and spaced apart from, an upright portion of a hand truck, the generally rectangular frame providing laterally spaced and separated lift rails;

a winch assembly enabled for being fixed to the upright portion of the hand truck opposite a lower end of the generally rectangular frame, the winch assembly engaged with a lifting cable, the lifting cable extending upwardly from a cable winding element of the winch assembly to a pulley mounted at an upper end of the generally rectangular frame and thence downwardly to engage a lifting platform;

the lifting platform extending generally horizontally outwardly from the generally rectangular frame and providing a means for directing the lifting platform along the lift rails while being slidably engaged therewith;

the cable winding means and the lifting cable cooperating for moving the lifting platform upwardly and downwardly along the lift rails.

5. The apparatus of claim 4 wherein the winch assembly further comprises an electrical storage battery providing motive energy for driving the cable winding element.

6. The apparatus of claim 4 wherein opposing bushings, being at different elevations, are positioned for tightening against the lift rails when a weight is applied to the lifting platform.

7. The apparatus of claim 4 wherein the lifting cable is applied so as to reduce the griping force of opposing bushings against the lift rails when the lifting cable is taught.

\* \* \* \* \*